(12) United States Patent
Kim

(10) Patent No.: US 6,809,573 B2
(45) Date of Patent: Oct. 26, 2004

(54) CIRCUIT FOR GENERATING HIGH VOLTAGE

(75) Inventor: Yong Hwan Kim, Choongcheongbuk-Do (KR)

(73) Assignee: Hynix Semiconductor, Inc., Ichon-shi (KR)

( * ) Notice: Subject to any disclaimer, the term of this patent is extended or adjusted under 35 U.S.C. 154(b) by 0 days.

(21) Appl. No.: 10/153,801

(22) Filed: May 24, 2002

(65) Prior Publication Data

US 2002/0175745 A1 Nov. 28, 2002

(30) Foreign Application Priority Data

May 25, 2001 (KR) ........................................ 2001-29030

(51) Int. Cl.[7] .............................. G05F 1/10; G05F 3/02
(52) U.S. Cl. ....................................................... 327/536
(58) Field of Search ................................ 327/536, 537, 327/589; 363/59–60; 365/189.09, 226

(56) References Cited

U.S. PATENT DOCUMENTS

| 5,276,646 | A | | 1/1994 | Kim et al. ............. 365/189.09 |
| 6,141,262 | A | * | 10/2000 | Sudo ..................... 365/189.09 |
| 6,278,316 | B1 | * | 8/2001 | Tanzawa et al. ............ 327/536 |
| 6,285,622 | B1 | * | 9/2001 | Haraguchi et al. .......... 365/226 |
| 6,320,455 | B1 | * | 11/2001 | Sudo .......................... 327/536 |

* cited by examiner

Primary Examiner—Quan Tra
(74) Attorney, Agent, or Firm—Birch, Stewart, Kolasch & Birch, LLP

(57) ABSTRACT

A circuit generating a high voltage and enabling a reduced power consumption by controlling the number of charge pumps in accordance with a current of an output terminal of a charge sensing unit. The circuit for generating a high voltage includes a charge pumping unit having a plurality of charge pumps, a current sensing unit generating a plurality of control signals by comparing currents flowing through final output terminals of the charge pumps to reference currents, respectively, and a control logic driving a plurality of the charge pumps in the charge pumping unit dynamically in accordance with a plurality of the control signals outputted from the current sensing unit.

11 Claims, 5 Drawing Sheets

| con0 | con1 | con2 | con3 | con4 | con5 | con6 | con7 | en3 | en2 | en1 | en0 |
|---|---|---|---|---|---|---|---|---|---|---|---|
| X | X | X | X | X | X | X | X | L | L | L | H |
| H | H | L | L | L | L | L | L | L | L | H | H |
| H | H | H | L | L | L | L | L | L | H | L | H |
| H | H | H | H | L | L | L | L | L | H | H | H |
| H | H | H | H | H | L | L | L | H | L | L | H |
| H | H | H | H | H | H | L | L | H | L | H | H |
| H | H | H | H | H | H | H | L | H | H | L | H |
| H | H | H | H | H | H | H | H | H | H | H | H |

X : DON'T CARE
H : HIGH
L : LOW

CIRCUIT FOR GENERATING HIGH VOLTAGE

FIELD OF THE INVENTION

The present invention relates to a circuit for generating a high voltage, and more particularly, to a circuit for generating a high voltage in a semiconductor memory.

BACKGROUND OF THE INVENTION

FIG. 1 illustrates a circuit for generating a high voltage according to a related art disclosed in U.S. Pat. No. 5,276,646, incorporated herein by reference.

Referring to FIG. 1, a high voltage generating circuit according to the prior art includes pull-up transistors 11 and 12 of which gates and drains are connected to a power source voltage Vcc and a plurality of charge pumps 100 connected in series between sources of the pull-up transistors 11 and 12. In this case, each of the charge pumps 100 includes capacitors 13 and 15 and transistors 14 and 16. And, a feedback circuit for controlling a high voltage level is placed between the charge pumps 100 and an output terminal 19.

The feedback circuit comprises an output voltage sense part 200 sensing a voltage of the output terminal 19, a reference voltage generation part 300 generating a reference voltage 310, a voltage comparison part 400 comparing the reference voltage 310 of the reference voltage generation part 300 to a sense voltage 260 of the sense part 200, and a control signal generation part 500 generating control signals 17 and 18 for controlling operation of the charge pumps 100 in accordance with a comparison signal 410 of the voltage comparison part 400.

The output voltage sense part 200 comprises resistors 201 and 202 connected in series between the output terminal and a ground Vss, a dynamic resistor part 250 including dynamic resistors 203, 205, 204, and 206 connected to the resistor 210 in parallel, and EEPROM fuse circuits 210 and 220 deciding a resistance of the dynamic resistor part 250 by sensing a programming state of a flash cell.

The EEPROM fuse circuits 210 and 220 respectively include depletion transistors 211 and 221 of which drains are connected to a terminal of the power source voltage Vcc and of which gates and sources are connected to each other in common, flash cells 212 and 222 connected between the sources of the depletion transistors 211 and 221 and the ground Vss, respectively, and inverters 213 and 223 inverting a voltage at an output node. In this case, the flash cells 212 and 222 are constructed with floating-gate FET.

The reference voltage generation part 300 comprises an inverter 301 inverting a write enable signal /WE and a plurality of transistors 302 to 305 connected in series between the terminal of the power source voltage Vcc and ground Vss. In this case, the transistors 302 and 305 are depletion transistors and transistors 303 and 304 are NMOS transistors. Moreover, gates of the depletion transistors 302 and 305 are grounded, while gates of the NMOS transistors 303 and 304 are connected to an output terminal of inverter 301.

The voltage comparison part 400 comprises a differential amplifier amplifying differentially the sense voltage 260 of the output voltage sense part 200 and the reference voltage 310 of the reference voltage generation part 300 by being enabled by an output of the inverter 406 and inverters 407 to 409 outputting a comparison signal 410 by inverting an output of the differential amplifier successively.

The control signal generation part 500 comprises NOR gates 501 and 502 NORing an output signal of the voltage comparison part 400, the write enable signal WE, and a clock signal $\Phi_p$ and inverters 503 to 505 outputting control signals 17 and 18 by inverting outputs of the NOR gates 501 and 502, respectively.

Operation of the above-constructed high voltage generation circuit according to the related art is explained by referring to the attached drawing as follows.

First, for an initial stage during which the charge pumps does not carry out pumping operation, a voltage level of the output terminal 19 maintains Vcc−Vth by the pull-up transistor 12.

When the write enable signal /WE is shifted to a low level on a data program stage, the reference voltage generation part 300 outputs the predetermined reference voltage 310 divided by the depletion transistors 302 and 305, and the voltage comparison part 400 outputs the comparison signal 410 by comparing the reference voltage 310 to the sense voltage 260 of the output voltage sense part 200 which is determined by the resistor distribution.

Namely, as the reference voltage 310 is higher than the sense voltage 260 at the present stage, the differential amplifier outputs an output signal of high level, and the comparison signal 410 becomes a low level since the output signal of high level is inverted successively by the inverters 407 and 409.

Therefore, the control signal generation part 500 becomes enabled by the write enable signal /WE, and then responds to the input clock signal $\Phi_p$ when the comparison signal 410 is on low level. Thus, the control signal generation part 500 generates pump control signals 17 and 18 having different levels. And, the charge pumps 100 initiate pumping operation in accordance with the pump control signals 17 and 18.

Operation of the charge pumps 100 is explained in detail as follows.

First of all, the drain of the NMOS transistor 14 is pre-charged with a voltage Vcc−Vth supplied through the other NMOS transistor 11 on the initial stage. In this case, the pump control signal 17 inputted to the capacitor 13 maintains a low level Vss.

When the pump signal 17 is shifted to a high level Vcc on the data program stage, a drain voltage of the drain of the NMOS transistor 11 increases to 2Vcc−Vt by the pumping operation of the capacitor 13 and the other NMOS transistor 14 is turned on, simultaneously. Therefore, the drain voltage 2Vcc−Vt of the NMOS transistor 11 is reduced to the extent of a threshold voltage Vt and then transferred to the drain of the NMOS transistor 16, whereby the drain of the next NMOS transistor 16 becomes pre-charged with 2(Vcc−Vt). In this case, the other pump control signal 18 inputted to the capacitor 15 maintains the low level Vss.

Thereafter, when the pump signal 18 is shifted to a high level, the drain voltage of the NMOS transistor 16 is increased to 3Vcc−2Vt by pumping operation of the capacitor 15 and the NMOS transistor 16 becomes turned on. The drain voltage 3Vcc−2Vt of the NMOS transistor 16 is reduced to the extent of the threshold voltage Vt and then transferred to the drain of the NMOS transistor 14 of the next charge pump 100. Therefore, a drain of the NMOS transistor 14 of the next charge pump 100 is pre-charged with 3(Vcc−Vt).

Thus, a plurality of the charge pumps 100 carry out the pre-charging and pumping operation repeatedly in accordance with the pump control signals 17 and 18, thereby increasing the voltage level of the output terminal step by step.

While a plurality of the charge pumps 100 increase the voltage of the output terminal 19, the output voltage sense part 200 plays a role of determining a level of the output voltage 207 to sense the voltage of the output terminal 19. Namely, the NMOS transistors 205 and 206 become turned on/off by changing information of the flash cells 212 and 222 in accordance with levels of control signals 251 to 254, whereby the resistors 203 and 204 are enabled to function as substantial resistance values.

Thereafter, when the sense voltage 260 becomes higher than the reference voltage as the voltage of the output terminal 19 is increased by the pumping operation of the charge pumps 100, the voltage comparison part 400 outputs the comparison signal 410 of high level. Therefore, the control signal generation part 500 becomes disabled by the comparison signal 410 of high level, whereby the charge pumps 100 stop the pumping operation.

Unfortunately, the charge pumps of the high voltage generation circuit according to the related art fail to operate if the output voltage is lower than the predetermined voltage. Therefore, a current is supplied from the output terminal on programming, thereby reducing the output voltage abruptly.

Moreover, the high voltage generation circuit according to the related art may generate a noise due to the voltage ripple during limiting the output voltage. Specifically, the charge pumps operate simply in accordance with variations of nodes, thereby increasing power consumption as well as the possibility of generating a noise.

SUMMARY OF THE INVENTION

Accordingly, the present invention is directed to a circuit for generating a high voltage that substantially obviates one or more problems due to limitations and disadvantages of the background art.

An object of the present invention is to provide a circuit for generating a high voltage enabling to reduce power consumption by operating charge pumps selectively in accordance with levels of an output voltage.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a circuit for generating a high voltage according to one embodiment of the present invention includes a charge pumping unit having a plurality of charge pumps; a current sensing unit generating a plurality of control signals by comparing currents flowing through final output terminals of the charge pumps to reference currents; and, a control logic driving a plurality of the charge pumps in the charge pumping unit dynamically in accordance with each control signal of a plurality of the control signals outputted from the current sensing unit.

A second embodiment of the present invention includes a circuit for generating a high voltage. The circuit includes a charge pumping unit having a plurality of charge pumps; a current sensing unit generating a plurality of control signals by comparing output currents flowing through final output terminals of the charge pumps to reference currents, the current sensing unit including a first PMOS transistor sensing an output current flowing through the final output terminal, and a plurality of reference cells generating control signals according to reference currents; a plurality of sense amplifying units current-mirroring the reference currents on a predetermined scale and comparing the current-mirrored reference currents to the output current sensed by the first PMOS transistor; and a control logic driving a plurality of the charge pumps in the charge pumping unit dynamically in accordance with a plurality of the control signals outputted from the current sensing unit.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to the preferred embodiments of the present invention, examples of which are illustrated in the accompanying drawings.

Figure 1:
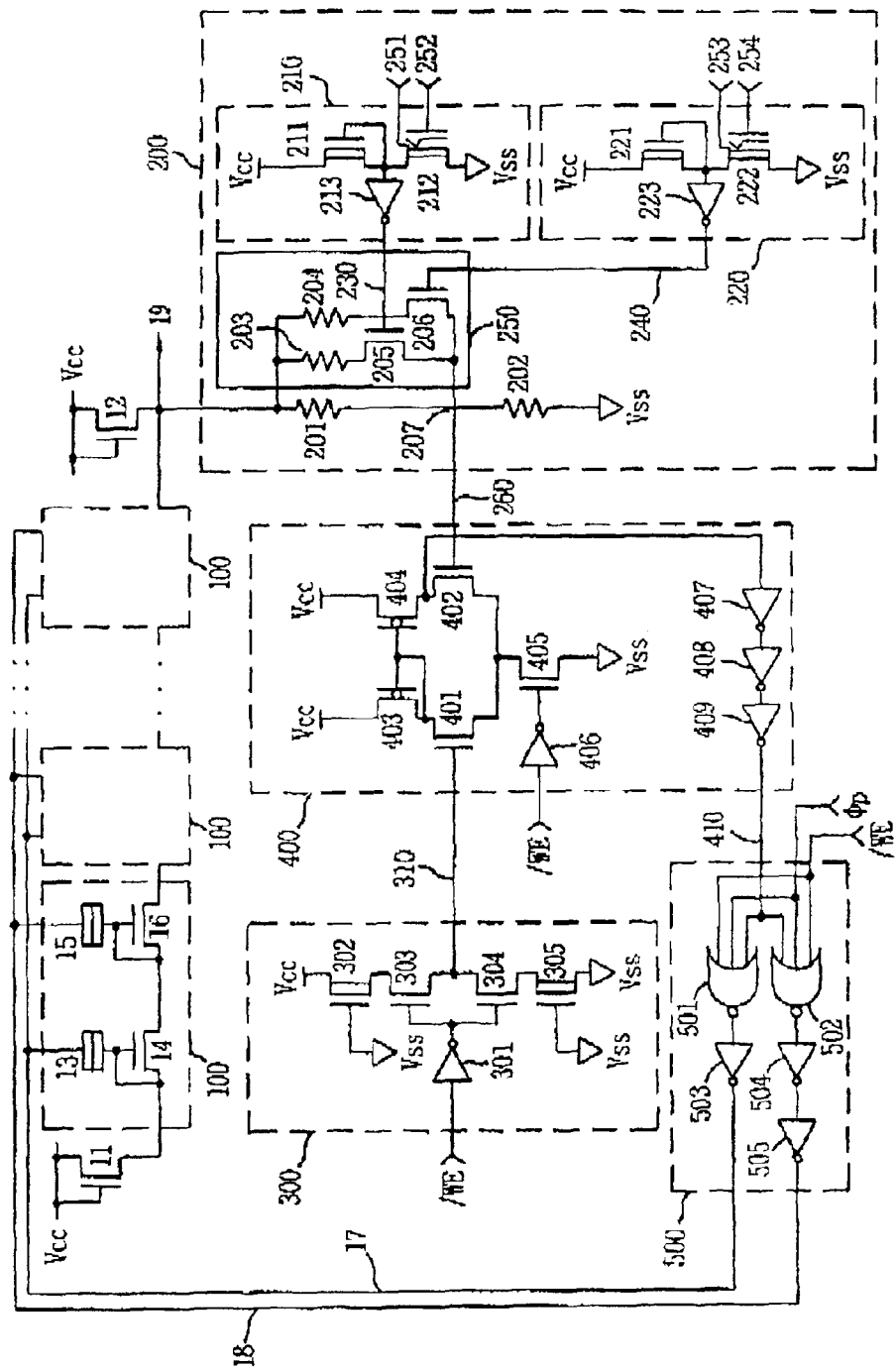
FIG. 1 illustrates a circuit for generating a high voltage according to the prior art.
Figures 2, 3:
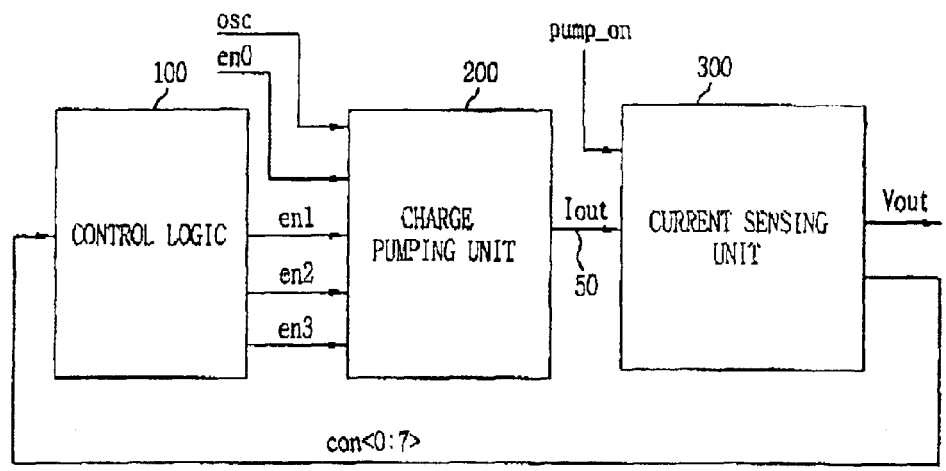
FIG. 2 illustrates a block diagram of a circuit for generating a high voltage according to one embodiment of the present invention.
FIG. 3 illustrates a logic table in a control logic in FIG. 2.

FIG. 2 illustrates a block diagram of a circuit for generating a high voltage according to the present invention.

Referring to FIG. 2, a circuit for generating a high voltage according to one embodiment of the present invention includes a control logic 100, a charge pumping unit 200, and a current sensing unit 300.

The control logic 100 generates enable signals en1 to en3 to control pumping operation of the charge pumping unit 200, the charge pumping unit 200 carries out the pumping operation in accordance with a pulse signal OSC and the enable signals en1 to en3 outputted from the control logic 100, and the current sensing unit 300 controls the control logic 100 by sensing a current flowing to an output terminal 50 of the charge pumping unit 200 in accordance with a pump-on signal pump_on.

The control logic 100 includes a true table, as shown in FIG. 3, and outputs enabling signals en1 to en3 corresponding to control signals con0 to con7 outputted from the current sensing unit 300.

Figure 4:
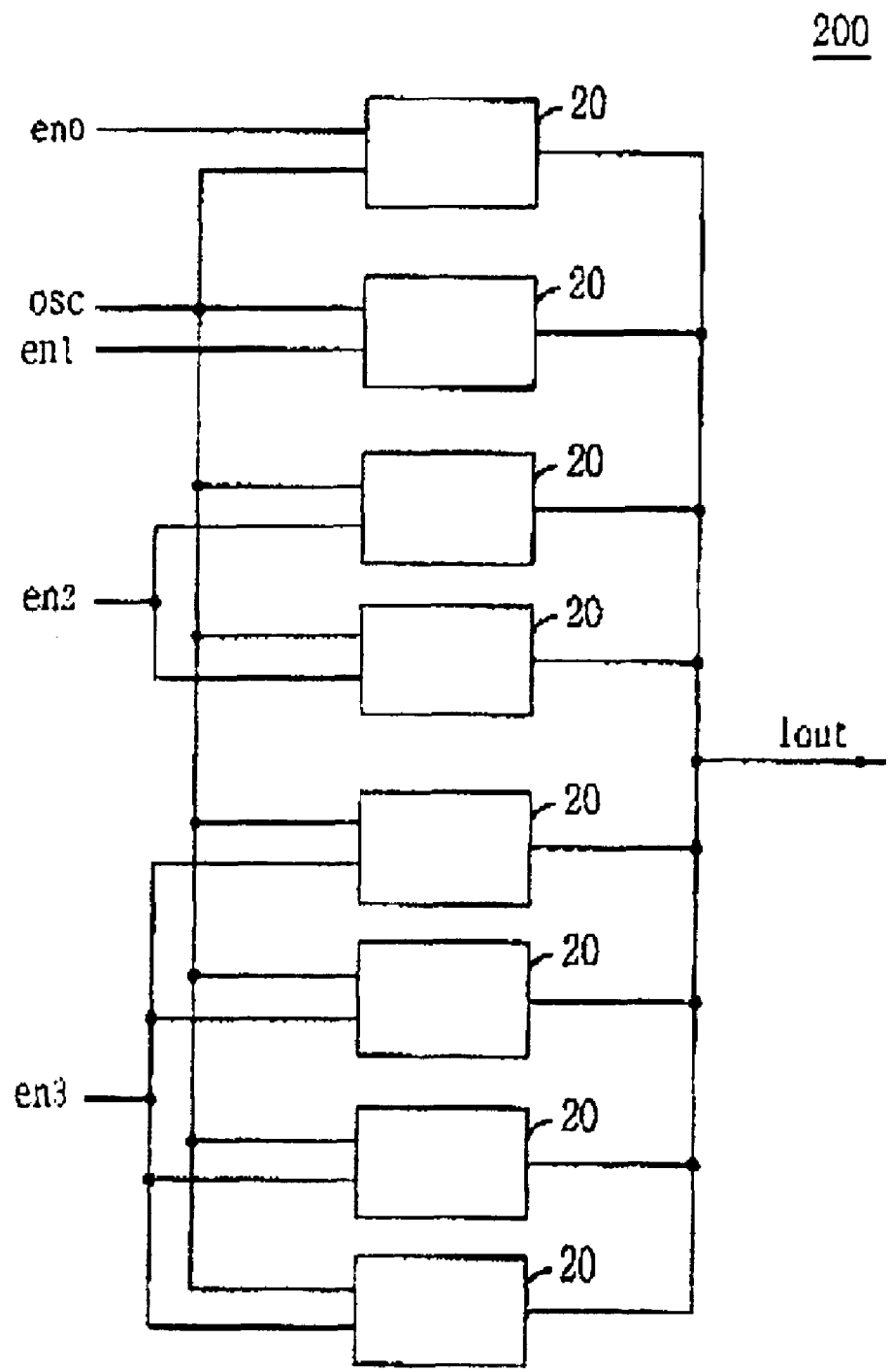
FIG. 4 illustrates a block diagram of a charge pumping unit in FIG. 2.

The charge pumping unit 200, as shown in FIG. 4, includes a plurality of charge pumps 20 carrying out pumping operation in accordance with the pulse signal OSC and enable signals en0 to en3. The pulse signal OSC functions as a clock.

Figure 5:
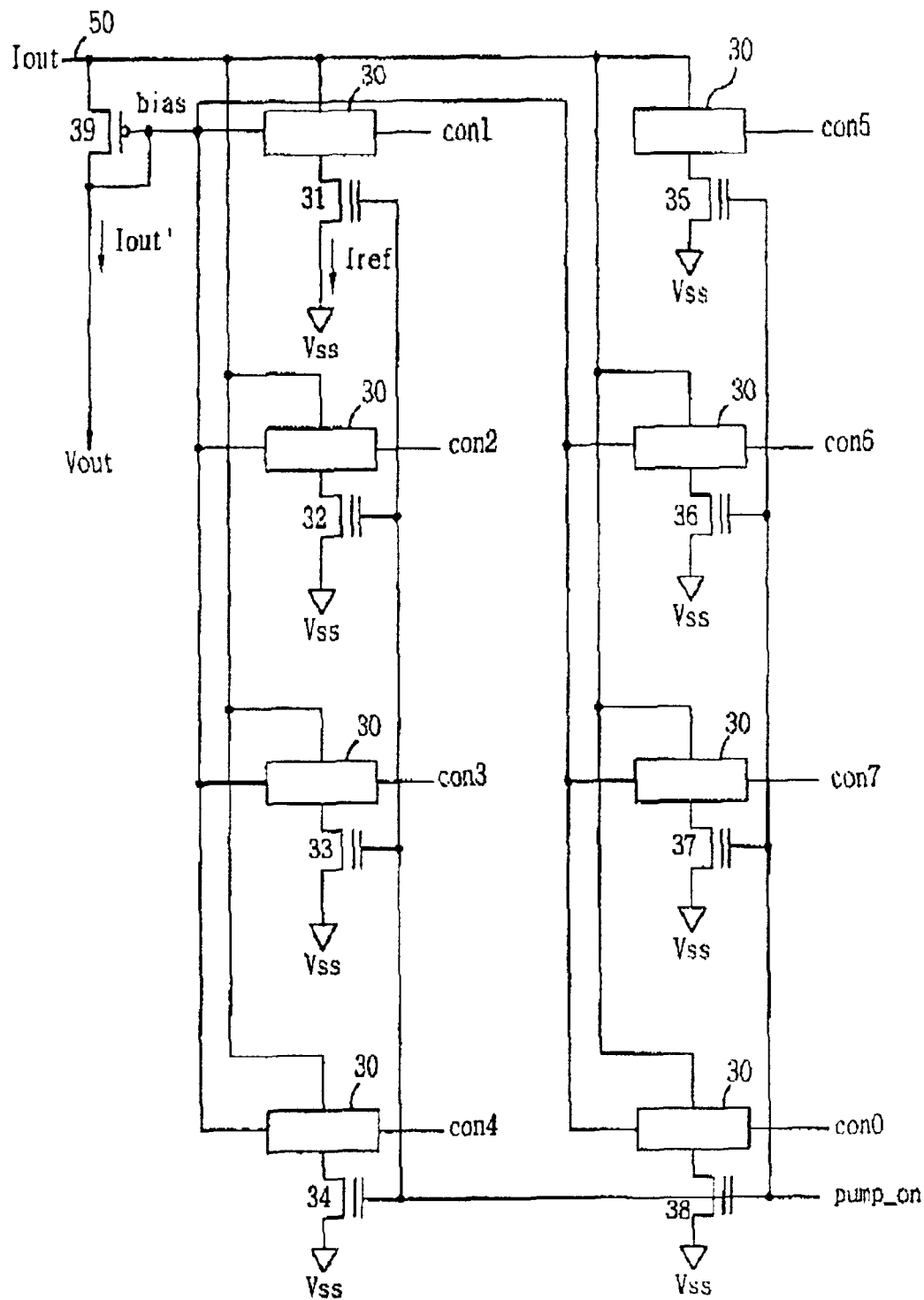
FIG. 5 illustrates a detailed construction of a current sensing unit in FIG. 2.

The current sensing unit 300, as shown in FIG. 5, includes a PMOS transistor 39 sensing a current Iout flowing through the output terminal 50, reference cells 31 to 38 generating predetermined currents Iref in accordance with the pump-on signal pump_on, and a plurality of sense amplifying units 30 generating the control signals con0 to con7 by comparison/amplification of the sense current Iout and reference current Iref. In this case, the reference currents Iref of the reference cells 31 to 38 are set up so as to be constant-proportional to each other.

Figure 6:
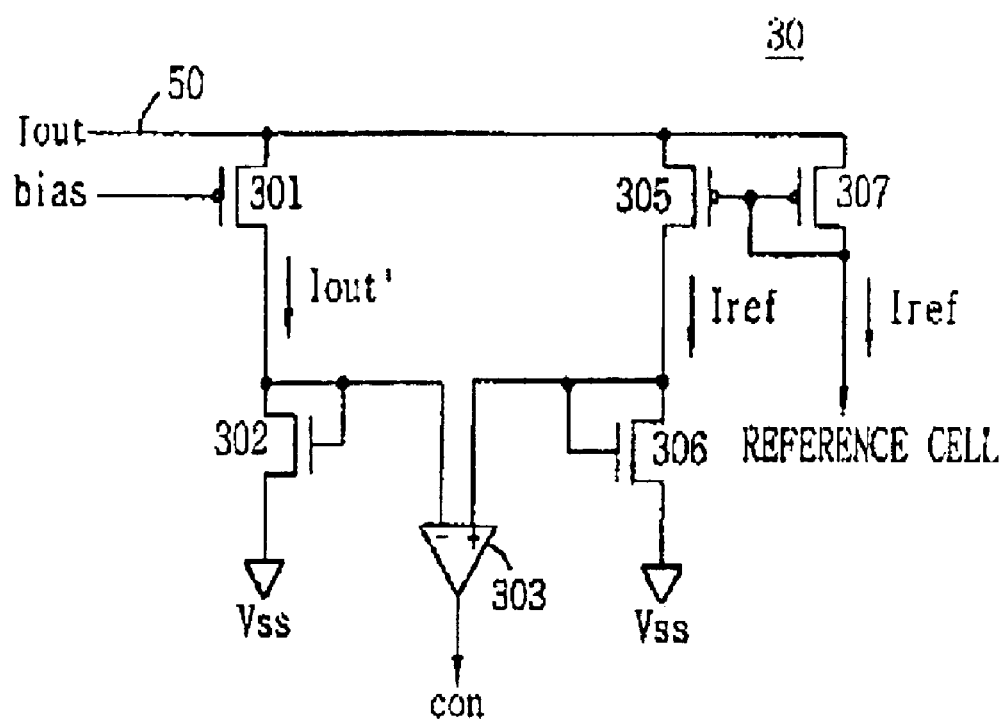
FIG. 6 illustrates a detailed construction of a sense amplifying unit in FIG. 5.

Each of the sense amplifying units 30, as shown in FIG. 6, include a PMOS transistor 301 constructing a current mirror with the PMOS transistor 39, an active load 302 transforming the sensed current Iout' inputted through the PMOS transistor 301 into a voltage, the other active load 306 transforming the reference current Iref of the corresponding reference cell sensed through the current mirror 305 and 307 to a voltage, and a differential amplifier 303 outputting a control signal con by amplifying the transformed voltage differentially.

Operation of the above-constructed circuit for generating a high voltage is explained by referring to the attached drawings as follows.

When the pump-on signal pump_on becomes active, as shown in FIG. 5, currents of several $\mu A$ flow through the reference cells 31 to 38. In this case, the currents flowing through the respective cells 31 to 38 are constant-proportional to each other. For instance, assuming that a current flowing through the current cell 31 is 1 $\mu A$, currents flowing through the reference cells 32 to 38 are 2, 3, ..., 8 $\mu A$ in order, respectively.

A plurality of the sense amplifying units 30 sense the reference currents Iref flowing through the reference cells 31 to 38, as shown in FIG. 6, using the current mirrors 305 and 307, and the current Iout flowing through the output terminal 50 of the charge pumping unit 200 through the current mirror 39 and 301 shown in FIG. 6 and FIG. 5. In this case, the PMOS transistor 301 is designed to have a size smaller than that Width/Length W/L of the PMOS transistor 39 on a scale of 1 to 500 so as to output a sensed current Iout' by current-mirroring the current Iout flowing through the output terminal 50 to the extent of $\frac{1}{500}$.

The active loads 302 and 306 transform the currents Iout' and Iref flowing through the PMOS transistors 301 and 305 into voltages, respectively. The transformed voltages are compared by the differential amplifier 303 so as to be outputted as the control signal con having a predetermined level. Thus, a plurality of the sense amplifying units 30 determine levels of the control signals con by comparing the reference currents Iref to the $\frac{1}{500}$-current-mirrored output currents Iout', respectively.

Namely, the control signal con0 is maintained as "H" level by the reference cell 38 not receiving the pump-on signal pump_on. Assuming that the reference current Iout flowing through the reference cell is 1 $\mu A$, the control signal con0 becomes high level when the current Iout' flowing through the PMOS transistor 39 is less than 500 $\mu A$, and the rest control signals con 2 to con7 become low level. Moreover, when the current Iout' flowing through the PMOS transistor 39 is less than 1 mA but greater than 500 $\mu A$, the control signals con0 and con1 are high level and the rest of the control signals con2 to con7 become low level. Thus, as the current Iout' flowing through the PMOS transistor 39 increases, levels of the respective control signals con1 to con7 are determined.

Using the true table in FIG. 3, the control logic 100 outputs the enable signals en0 to en3 corresponding to the control signals con0 to con7 outputted from the current sensing unit 300.

Therefore, the charge pumping unit 200 operates a plurality of the charge pumps selectively(dynamically) in accordance with the pulse signal OSC and the enable signals en0 to en3 outputted from the control logic 100. Namely, as shown in FIG. 4, one of the charge pumps 20 is always operated in accordance with the enable signal en0 of high level, and another charge pump 20 is operated additionally if the enable signal en1 becomes high level. Thus, two of the charge pumps are operated. Moreover, when the enable signal en2 becomes high level, another two charge pumps 20 come into operation additionally. Thus, four of the charge pumps 20 are operated. Further, when the enable signal en3 becomes high level, another four charge pumps 20 come into operation additionally. Thus, eight of the charge pumps 20 are operated. Therefore, a number of charge pumps in operation is equal to $2^N$, where N is the number of the enable signal ranging from 0-Y.

Accordingly, the present invention enables to reduce power consumption by controlling the number of charge pumps in accordance with an output current of a high voltage generator.

Moreover, the present invention enables to program the respective reference cells and secure a process margin by determining the status of the reference cells in accordance with an output load of a high voltage generator or the capacity of charge pumps.

Furthermore, the present invention enables to reduce a size of a pumping capacitor of a charge pump by reducing unnecessary power consumption.

The invention being thus described, it will be obvious that the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A circuit for generating a high voltage, comprising:
   a charge pumping unit having a plurality of charge pumps, one charge pump of the plurality of charge pumps always operating;
   a current sensing unit generating a plurality of control signals by comparing currents flowing through final output terminals of the charge pumps to reference currents;
   a control logic driving a plurality of the charge pumps in the charge pumping unit dynamically in accordance with each control signal of the plurality of the control signals outputted from the current sensing unit,
   wherein the current sensing unit comprises:
      a first PMOS transistor sensing an output current flowing through an output terminal;
      a plurality of reference cells generating control signals in accordance with the reference currents; and
      a plurality of sense amplifying units current-mirroring the reference currents on a predetermined scale and comparing the current-mirrored reference currents to the output current.

2. The circuit of claim 1, wherein the control logic outputs at least one enable signal to the charge pumping unit, and X charge pumps of the plurality of charge pumps are driven, where
   $X=2^N$ and N equals a number from (0-Y) corresponding to an enable signal.

3. The circuit of claim 1, wherein the reference currents are constant-proportional to each other.

4. The circuit of claim 1, wherein each of the sense amplifying units comprises:
- a second PMOS transistor constructing a current mirror with the first PMOS transistor so as to sense the output current flowing through the output terminal on a predetermined scale;
- a first current mirror sensing the reference current flowing through the reference cell;
- first and second active loads transforming the currents sensed by the second PMOS transistor and the first current mirror into voltages, respectively; and
- a differential amplifier amplifying the voltages transformed by the first and second active loads so as to output the control signal.

5. The circuit of claim 4, wherein a size of the second PMOS transistor is 1/500 smaller than that of the first PMOS transistor.

6. The circuit of claim 1, wherein the control logic stores enabling signals corresponding to the control signals as in a table format.

7. A circuit for generating a high voltage, comprising:
- a charge pumping unit having a plurality of charge pumps;
- a current sensing unit generating a plurality of control signals by comparing output currents flowing through final output terminals of the charge pumps to reference currents, the current sensing unit including a first PMOS transistor sensing an output current flowing through the final output terminal, and a plurality of reference cells generating control signals according to reference currents;
- a plurality of sense amplifying units current-mirroring the reference currents on a predetermined scale and comparing the current-mirrored reference currents to the output current sensed by the first PMOS transistor; and
- a control logic driving a plurality of the charge pumps in the charge pumping unit dynamically in accordance with a plurality of the control signals outputted from the current sensing unit.

8. The circuit of claim 7, wherein the reference currents are constant-proportional to each other.

9. The circuit of claim 7, wherein each of the sense amplifying units comprises:
- a second PMOS transistor constructing a current mirror with the first PMOS transistor so as to sense the output current flowing through the output terminal on a predetermined scale;
- a first current mirror sensing the reference current flowing through the reference cell;
- first and second active loads transforming the currents sensed by the second PMOS transistor and the first current mirror into voltages, respectively; and
- a differential amplifier amplifying the voltages transformed by the first and second active loads so as to output the control signal.

10. The circuit of claim 9, wherein a size of the second PMOS transistor is 1/500 smaller than that of the first PMOS transistor.

11. The circuit of claim 7, wherein the control logic stores enabling signals corresponding to the control signals in a table format.

\* \* \* \* \*